Figure 1:
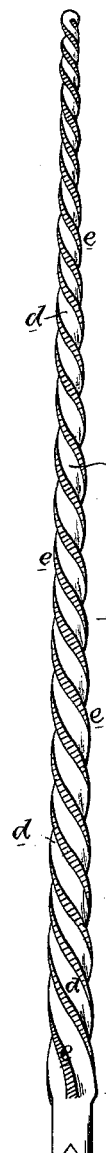
Figure 2:

P. HEFFERNAN.
FILE.

No. 189,733. Patented April 17, 1877.

Witnesses
Henry Howson Jr
Harry Smith

Pierce Heffernan
by his Attorneys
Howson and Son

UNITED STATES PATENT OFFICE.

PIERCE HEFFERNAN, OF PHILADELPHIA, PENNSYLVANIA, ASSIGNOR TO HIMSELF, ULRICH WIDMER, AND HENRY TROTTMANN, OF SAME PLACE.

IMPROVEMENT IN FILES.

Specification forming part of Letters Patent No. 189,733, dated April 17, 1877; application filed March 30, 1877.

*To all whom it may concern:*

Be it known that I, PIERCE HEFFERNAN, of Philadelphia, Pennsylvania, have invented a new and useful Improvement in Files, of which the following is a specification:

The object of my invention is to so construct a round file that it will be truer, circumferentially, than an ordinary round file, and so that the interstices between the teeth may be readily cleared.

My improved file (represented in the accompanying drawing) has the usual shank $a$, to be driven into a handle; but the body A is made with spiral grooves $d$, alternating with spiral ribs $e$, on which the teeth are cut.

In making my improved file, I prefer to twist a hot bar of steel of the desired shape, so as to produce the spiral grooves and ribs. A tapering bar, of square section, may be twisted so as to form four spiral grooves and four ribs, the latter, in the first instance, having sharp edges, but being reduced to form a proper spiral surface, on which the teeth may be cut, as shown in the drawing. If a bar of oblong section be twisted, there will be two spiral grooves and two spiral ribs, the narrow edges of the bar forming the spiral surfaces on which the teeth are cut.

It should be understood that, while I prefer the making of the file-blank by twisting a bar, I do not desire to limit myself to this plan, as other modes may be adopted. A spiral groove, for instance, may be made in a round bar by a screw-cutting lathe, and teeth cut on the spiral rib, formed by cutting the groove.

In ordinary round files there is always more or less irregularity in the teeth, which are cut in sets on the rounded surface, and this irregularity in the teeth renders the file more or less untrue circumferentially, so that difficulty is experienced in filing objects truly.

In my improved file, however, the teeth are uniform throughout, and may be cut across the rib at any desired angle. If the blank be circumferentially true in the first instance, no departure from this truth will be caused by cutting the teeth on the spiral rib or ribs.

It will be evident that the file possesses the further advantage of being easily cleared of particles which may temporarily choke the teeth, a slight tap of the file against any rigid object serving to dislodge the obstructions, owing to the narrowness of the ridge on which the teeth are cut.

I claim as my invention—

1. As a new manufacture, a round file, in which the teeth are on a spiral rib or ribs, alternating with a spiral groove or grooves, as set forth.

2. The mode herein described of making round files—that is to say, first twisting a bar of steel, and then cutting teeth on the rib or ribs formed by thus twisting the bar, all as set forth.

In testimony whereof I have signed my name to this specification in the presence of two subscribing witnesses.

PIERCE HEFFERNAN.

Witnesses:
HERMANN MOESSNER,
HARRY SMITH.